United States Patent [19]
Sullivan

[11] Patent Number: 5,351,296
[45] Date of Patent: Sep. 27, 1994

[54] FINANCIAL TRANSMISSION SYSTEM
[75] Inventor: Mark K. Sullivan, Joplin, Mo.
[73] Assignee: Niobrara Research & Development Corporation, Joplin, Mo.
[21] Appl. No.: 38,895
[22] Filed: Mar. 29, 1993
[51] Int. Cl.⁵ .............................................. H04K 1/00
[52] U.S. Cl. ...................................... 380/24; 380/23; 379/97
[58] Field of Search ....................... 380/21, 23, 24, 25, 380/29, 49; 235/379, 380, 382; 379/91, 97, 98

[56] References Cited

U.S. PATENT DOCUMENTS

| | | | |
|---|---|---|---|
| 4,691,344 | 9/1987 | Brown et al. | 379/413 X |
| 4,707,592 | 11/1987 | Ware | 379/91 X |
| 4,847,899 | 7/1989 | Hikida | 379/413 |
| 4,897,865 | 1/1990 | Canuel | 379/91 |
| 5,157,717 | 10/1992 | Hitchcock | 379/98 X |

OTHER PUBLICATIONS

J. Svigals; "Low cost Point of Sale Terminal"; IBM Technical Disclosure Bulletin vol. 25 No. 4 Sep. 1982; 379/91.

Borision, Scott; "Transaction telephone gets the facts at the point of sale"; Bell Labs Record; vol. 53, No. 9, pp. 377-383; Oct. 1975.

*Primary Examiner*—Tod R. Swann
*Attorney, Agent, or Firm*—Senniger, Powers, Leavitt & Roedel

[57] ABSTRACT

A method and device for determining and securely transmitting an account code of a financial card over a communications link in a communications network to a remote location which also allows a telephone to be used concurrently to perform voice communications over the same communications link with the remote location. The device generally comprises a control circuit for controlling the operation of the device, a transmitter for transmitting data to the remote location, a receiver for receiving information from the remote location, and a power supply for supplying power to the device. The device also comprises a reader circuit for determining the account code of the financial card. In the preferred embodiment, the device also comprises an entering circuit, such as a keypad, for entering a secret PIN code portion of the account code. Also, a method is disclosed for securely transmitting the secret PIN code portion and/or a detectable code portion of the account code over the communications circuit, preferably by a unique encryption process. Moreover, in the preferred embodiment, the power supply connects to the telephone line and supplies power to the device solely by the power received from the telephone line, without interfering with the operation of the telephone line.

49 Claims, 6 Drawing Sheets

Fig. 1. - Prior Art

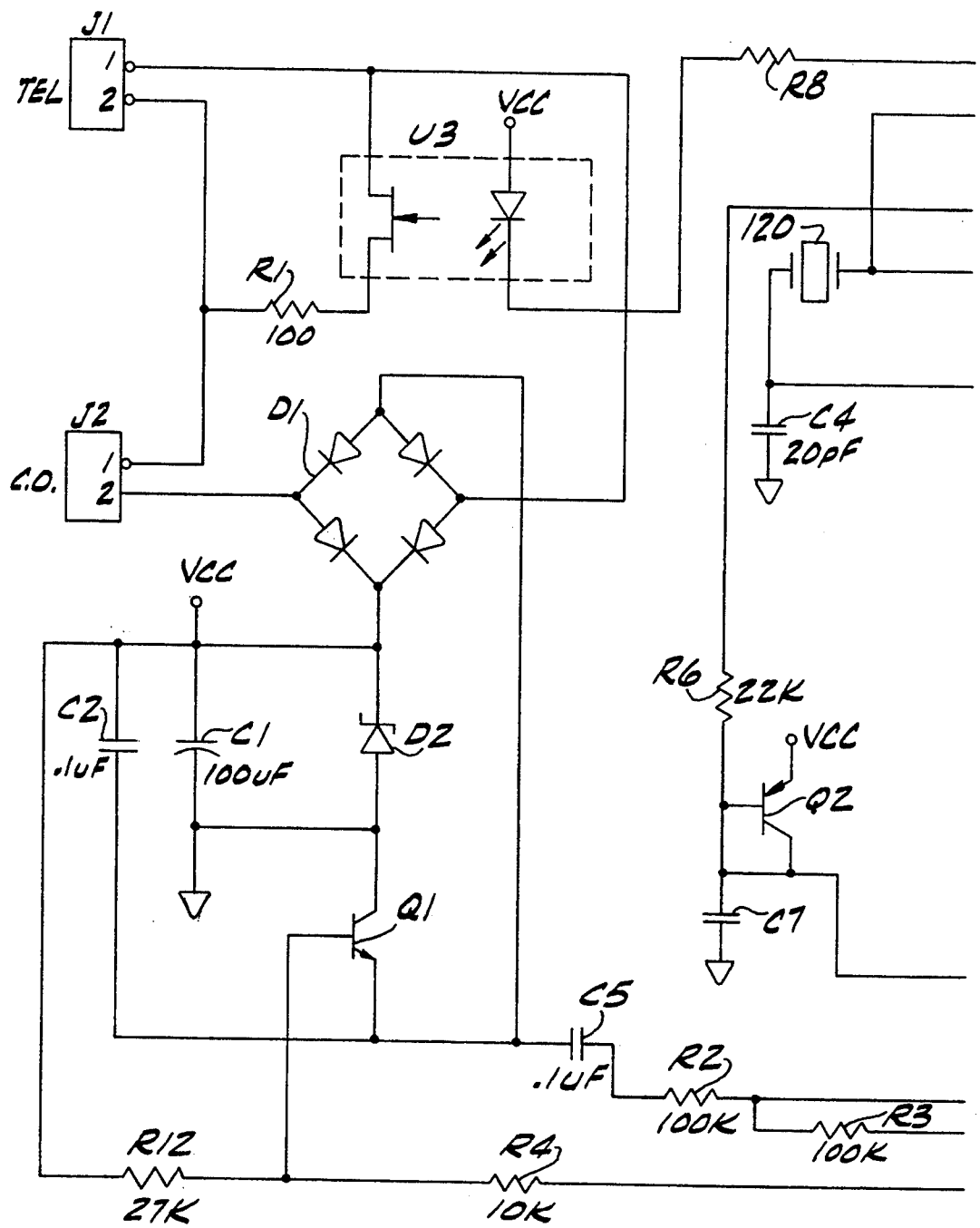
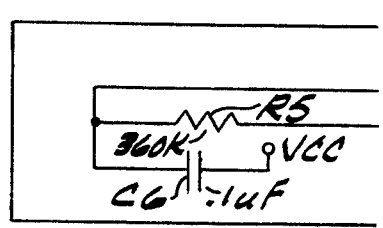
FIG. 5A

FINANCIAL TRANSMISSION SYSTEM

FIELD OF THE INVENTION

This invention relates to performing financial transactions with a financial card over a communications network, and, more particularly, to a method and device for determining and securely transmitting an account code of such a financial card over a communications link in a communications network to a remote location.

BACKGROUND OF THE INVENTION

Over the past couple of decades, buyers and sellers have increasingly used credit cards to perform financial transactions regarding the sale of goods and services by telephone. Mail order transactions and television "home shopping" programs are but a couple of examples of this emerging and rapidly increasing trend. Such transactions provide significant advantages for both the buyer and the seller. The seller is able to reach national, and even international, markets without the need for establishing retail sales locations in diverse geographic locations. Moreover, because sellers can readily check the status and credit availability of a particular financial card at the time of the sale by established computer driven credit card verification systems, the seller is alleviated of the burden of trying to collect payments for bills. Buyers likewise benefit from such simplified financial transactions because buyers are able to purchase goods and acquire services without leaving their homes.

However, the prior art system of performing financial transactions described above has problems and significant limitations. A widespread problem involves credit card fraud. It is relatively easy to obtain credit card numbers from past transaction slips. Likewise, credit cards are frequently placed on counters at stores and the like, thereby making the credit card account number readily visible to other persons. A known method of fraud concerns illegal use of a credit card account number in a phone financial transaction by someone who has misappropriated the account number. In such transactions, the card is obviously not present during the transaction, and thus it is difficult, if not impossible, for the seller to verify that the caller has the credit card. The credit card companies have passed the burden of illegal telephone credit card transactions onto the seller by requiring the seller to pay the credit card company a "charge back" when a credit card holder refuses payment for a telephone transaction because the buyer alleges that the buyer did not purchase the item or service.

Another problem associated with the prior system is that numerous consumers do not have credit cards for a variety of reasons. Thus, these consumers are unable to take advantage of the ease of phone financial transactions. This problem is becoming more prevalent because many credit card companies are more selective in issuing cards during the present difficult economic times.

And still a further limitation of current phone financial transaction systems is the inability of the buyer to draw money directly against the buyer's checking or savings account, as opposed to purchasing against a credit card, when purchasing goods or services by telephone. There is currently no system for allowing consumers to purchase goods or services against their checking or savings account from their homes. The primary reason is that current banking laws require that a secret personal identification number (PIN) number be used to withdraw funds from the account holder's account from a remote location, such as is common in automatic teller machine (ATM) transactions. Such PIN numbers are not imprinted or magnetically coded on the financial card, but rather are memorized and/or written down by the financial card owner to provide increased security against unauthorized use of the financial card. Moreover, in transmitting such PIN numbers, federal banking laws require that the PIN numbers be transmitted in encrypted form to prevent theft or pirating during transmission. Thus, performance of such a transaction from a consumer's home would require an encryption method which ensures the secrecy of the PIN number during transmission across the communications network.

There is not a analogous law which requires that the account code printed on an ATM card or credit card be transmitted in encrypted form. Thus, at present, account codes on ATM type cards and on credit cards are transmitted in the clear, i.e., without being encrypted, thus providing an opportunity for unauthorized persons to obtain the number through known computer deciphering techniques. Such a procedure presents an invitation to misappropriate the account numbers during transmission across the communications network.

OBJECTS AND SUMMARY OF THE INVENTION

It is therefore a primary objective of the current invention to provide a method and device for performing financial transactions over a communications network, such as the telephone network, using a credit card or debit card. A similarly important object of this invention is to provide a method and device for ensuring that PIN numbers and/or account numbers associated with such cards are transmitted over the communications network securely. To this end, an object is to transmit such numbers using a device which provides for transmission of the account code numbers over a communications link in a communications network to a remote location, and which concurrently allows for audio communication with the remote location.

A more particular object of the present invention is to provide a device which connects to a telephone, and provides electronic equipment capable of reading an account card, and transmitting and receiving data to and from computers at remote locations, respectively. A related object is to provide such a device which is adapted to be powered solely by the communications circuit, or, more particularly, the telephone line. Thus, an object is to power the device from the telephone line power without interfering with the operation of the telephone. Moreover an object is to provide a power supply which performs a switching operation among its components to reduce the power drawn by the device.

Yet another object is to provide a device which incorporates a circuit to mute audio signals to the earphone of a telephone which are generated by the device to prevent or minimize discomfort to the listener's ear. A related object is to provide such a muting circuit which does not interfere with data transmission by the device or voice communication by the telephone to remote locations.

Moreover, an object is to construct such a device with low cost electronic parts so that noncommercial consumers can afford to purchase the device. Also, an object is to construct such a device with parts which will provide the longevity required by household use of such a device.

Another important object is to disclose a method for securely transmitting the secret account code portion of a financial card (e.g., a PIN number) and/or the nonsecret code portion of the financial account number of the financial card. A related object is to disclose a method for allowing the device and a remote acquirer computer to determine a secret common encryption key for transmitting data back and forth securely.

To accomplish these and other related objects of the invention, a method and device are disclosed for determining and securely transmitting an account code and/or personal identification number (PIN) of a financial card over a communications link in a communications network to a remote location, and which provide the capability of allowing a telephone to be used concurrently to perform voice communications over the same communications link with the remote location. The device of the present invention generally comprises a control circuit, a reader apparatus, a transceiver, and a communications connector. The control circuit controls operation of the device. The reader apparatus determines the account code of the financial card. The transceiver transmits the account code over the communications link of the communications network and receives information sent by the remote computer via the communications link, and provides such information to the control circuit. The communications connector is adapted to connect the device to the telephone so that voice communications can be performed by the telephone over the same communications link which establishes the connection of the device to the remote computer.

In the preferred embodiment, the device further comprises an entering apparatus, such as a keypad, for manually entering a secret PIN code related to the account code of the financial card. Further, the device preferably comprises a power supply connected to the telephone line for supplying power to the device solely by the power received from the telephone line. In the preferred embodiment, the power supply performs a switching function between various components of the device to reduce the power drawn by the device, thereby avoiding interference with the operation of the telephone.

Also in the preferred embodiment, the transceiver transmits the detected account code of the financial card in DTMF signals. Further, a muting circuit is disclosed for connection between the telephone and the device which mutes the DTMF signals to the telephone which are generated by the device to avoid damage and discomfort to the listener's ear.

Another important aspect of the invention involves a method for encrypting the secret PIN code portion and/or the detectable code portion of the financial card. The method generally comprises the following steps: programming a secret master key into the device; programming a nonsecret identity offset into the device which corresponds to the master key; maintaining a lookup table associating the master key to the nonsecret identity offset at the device issuer location; generating a working key for encrypting data between the acquirer computer and the device; and using the identity offset, the master key and the lookup table to make the working key common between the acquirer and the device. Thus, the acquirer and the device can thereafter transmit data (such as the secret PIN number) securely therebetween.

The present invention therefore overcomes the deficiencies of the prior art which only allows phone financial transactions to be performed with a credit card, and which also facilitates credit card fraud. The present invention discloses a device which requires the credit card to be present during a phone transaction, and also allows debit cards, such as ATM cards, to be used to conduct such phone financial transactions without violation of current banking laws. Moreover, the device and method disclosed with the present invention allow the user to interactively perform audio communications with a remote computer and/or human operator, over the same communications link used by the device to transmit and receive data to and from the remote location, respectively. The present invention, therefore, provides buyers and sellers with a much higher degree of flexibility and security when conducting telephone financial transactions.

BRIEF DESCRIPTION OF THE DRAWINGS

In the accompanying drawings which form a part of the specification and are to be read in conjunction therewith and in which like reference numerals are used to indicate like parts in the various views.

DETAILED DESCRIPTION OF THE PREFERRED EMBODIMENTS

Before turning to the detailed description of the preferred embodiments of the present invention, a discussion of the prior art automatic teller machine (ATM) network will be helpful in understanding the present invention.

Prior Art ATM Network

Figure 1:
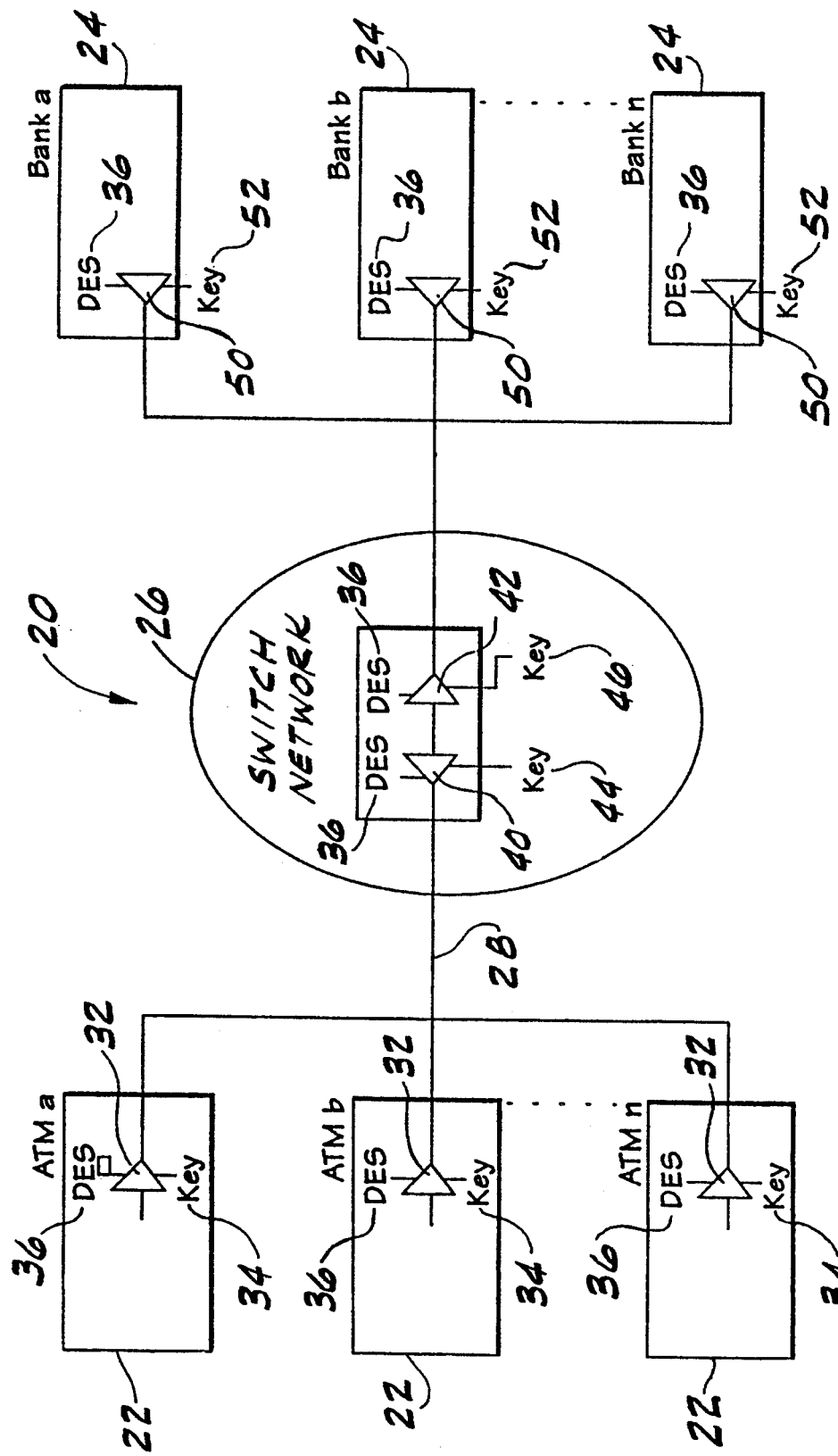
FIG. 1 is a diagram of the prior art automated teller machine (ATM) financial network.

Referring to FIG. 1, a simplified prior art automatic teller machine (ATM) network is shown, and generally designated 20. The ATM network 20 generally comprises a plurality of ATM machines 22a–n, a plurality of banks 24a–n, interconnected by a financial interchange switch network 26. A communications network 28 interconnects the switch network to the ATM machines 22a–n and to the banks 24a–n.

The banks 24a–n can be, and typically are, unrelated entities that issue ATM cards to bank patrons. This arrangement allows an ATM card holder to withdrawn funds from an associated savings or checking account at any ATM machine 22a–n from one of the banks 24a–n that issued the card and is associated with the switch network 26. There are multiple such networks including Cirrus, Bank Mate, NYCE, and others which perform switch network services.

The ATM financial cards (similar to the financial card 27 shown in FIG. 3), which are used to withdraw funds at one of the ATM machines 22a–n from one of the banks 24a–n, have an account code comprising two fields. The first field of the ATM card, referred to herein as a detectable code 25, is typically imprinted on the front of the ATM card, and is also magnetically coded on a magnetic stripe on the back of the ATM card (not shown), along with additional information such as the expiration of the financial card. The ATM machines 22a–n have an electronic device which reads the magnetic stripe to determine the detectable code 25. The second field is a secret personal identification number (PIN) which is not detectable, i.e., it is not imprinted on the ATM card, nor is it magnetically stored on the ATM card. The secret PIN should be devoted to memory by the ATM card owner and/or written down in a safe place. When performing an ATM financial transaction, the card owner first runs the ATM card through the electronic device (card reader) which electronically detects ("reads") the magnetic stripe to determine the detectable code field. The ATM machine then prompts the ATM card holder to enter the secret PIN number to verify that the person entering the card into the ATM machine is in fact the owner of the ATM card. The secret PIN is therefore a security measure which minimizes the chances of someone misappropriating the ATM card and withdrawing funds from the ATM card holder's associated savings or checking account.

After the user enters the correct secret PIN number associated with the ATM card, the ATM machine next transmits the account code of the ATM card, the encrypted PIN number, and details of the requested transaction to the switch network 26. The switch network forwards this information to the bank that issued the ATM card, which could be any one of the banks 24a–n. The bank verifies that the secret PIN number is associated with the detectable code of the ATM card entered into the ATM machine, and then authorizes the financial transaction requested by the ATM card holder, such as withdrawing funds from the ATM card holder's account if sufficient funds are available.

In performing the above-described transaction, the ATM machine must transmit the secret PIN number across the communications network 28. As described above, current banking laws require that the secret PIN number be transmitted across the communications network 28 in an encrypted form to prevent detection and theft of the secret PIN number while in transit across the communications network 28. Such laws recognize the significant risk that unscrupulous persons having technological "know how" might readily detect and steal the detectable code and the secret PIN number, if the PIN number were transmitted in the clear (i.e., unencrypted form).

To prevent such a mishap and to comply with the federal banking laws, the switch network methodology of the switch network 26 shown in FIG. 1 was developed for securely encrypting PIN numbers transmitted across the communications network 28. FIG.1 is an extremely simplified model of the existing ATM network, but is sufficient for illustrating the ATM methodology relevant to understanding the present invention.

The ATM machines 22a–n employ encryption devices 32a–n and corresponding encryption keys 34a–n.

The ATM machines 22a–n also comprise a Data Encryption Standard (hereinafter "DES") algorithm 36 which is well-known in the art, and is common to all ATM machines 22a–n, the switch network 26 and the banks 24a–n. The DES encryption is described in Federal Information Processing Standard (FIPS) Publication 46-1, available from the National Technical Information Service (NTIS). During a financial transaction, a particular ATM machine will transmit packets of information to the switch network 26. Such packets of information include the identity of the ATM machine (i.e., one of the ATM machines 22a–n), the identity of the bank (i.e., one of the banks 24a–n), the detectable code 25 of the financial card 27, and the PIN number in encrypted form (as will be described below), and/or other transaction and network specific information.

The switch network 26 comprises encryption devices 40 and 42, the DES algorithm 36, and variable encryption keys 44 and 46, corresponding to the encryption devices 40 and 42, respectively. The encryption devices 40 and 42 comprise software and circuitry for receiving the packets of information from the ATM machines 22a–n, and for processing that information. During a financial transaction, the encryption device 40 would determine, based upon the packeted information, which ATM machine was transmitting information, and would use the encryption key corresponding to the transmitting ATM machine to translate the encrypted PIN for transmission to the appropriate bank.

The banks 24a–n comprise encryption devices 50a–n, corresponding encryption keys 52a–n, and the DES algorithm 36. The encryption device 42 of the switch network 26 uses the encryption key corresponding to the destination bank to transmit the secret PIN number. The corresponding encryption device (i.e., one of the encryption devices 50a–n) verifies the transmitted encrypted PIN number by unencryption or other means. The bank thereafter processes the information to authorize the corresponding ATM machine to perform the financial transaction requested by the ATM card holder.

Thus, the switch network 26 is the only entity that knows all of the encryption keys for all of the ATM machines 22a–n and all of the banks 24a–n. The financial network therefore desirably provides for a separation of secrets relating to the encryption keys and the secret PIN numbers between the banks 24a–n, which are typically different entities.

Preferred Embodiments

Figure 2:
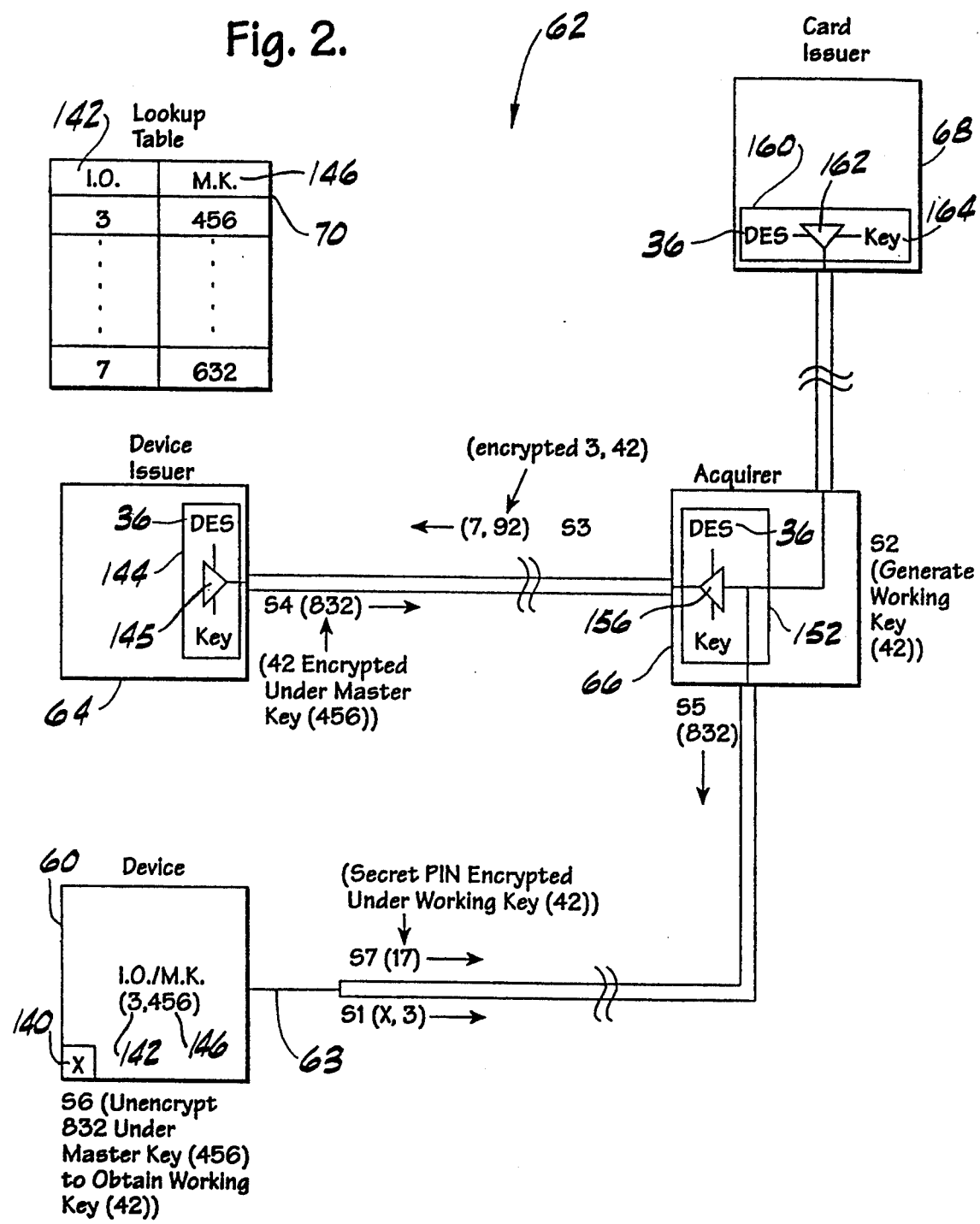
FIG. 2 is a diagram of the device in accordance with the present invention interfaced to a communications network.
Figure 3:
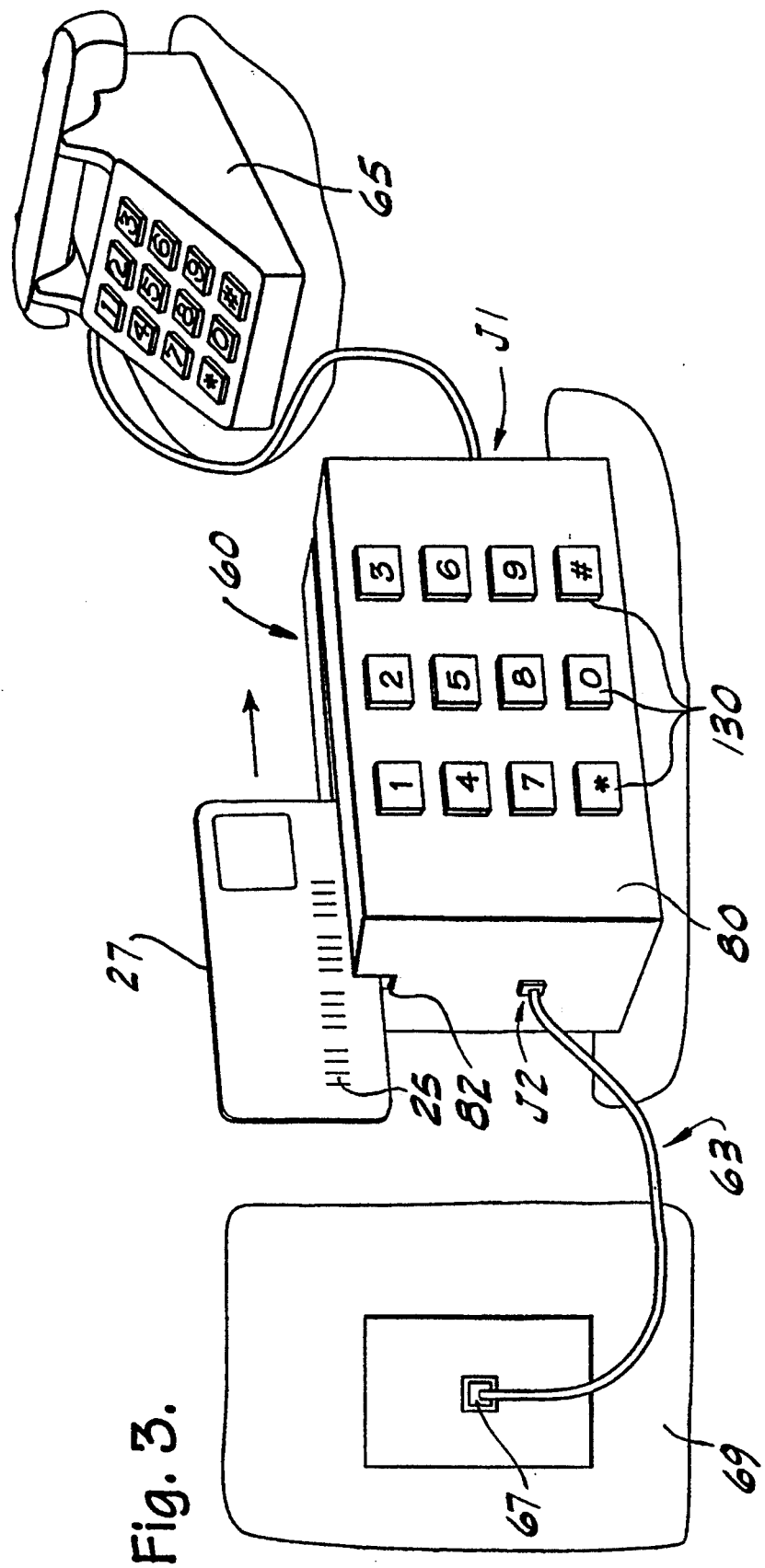
FIG. 3 is a perspective view of the device in accordance with the present invention connected between a telephone and the incoming telephone line, and also showing a financial card adapted to be used in conjunction with the device to perform financial transactions.

Turning now to the present invention, FIG. 2 shows the device 60 connected to a telephone line 63 in a communications network, such as the public switched telephone network, generally designated 62. Referring to FIG. 3, the telephone line 63 connects to the communications network 62 via a telephone jack 67 mounted on a wall 69, as is well known. The device is connected to the communications network 62 in series between the telephone line 63 and a telephone 65 adapted to transmit audio communications across the communications network.

The device 60 is adapted to perform financial transactions over the communications network 62 with an entity at a remote location using the financial card 27. Referring to FIG. 2, the other entities that will likely be necessary to perform a financial transaction are: the device issuer 64; the acquirer 66; and the financial card issuer 68. The acquirer 66 is the entity with which the owner of the device 60 desires to conduct a financial transaction. Such entities might include banks, service bureaus, and switch companies. The financial card issuer 68 issues the financial card 27 to clients such as the owner of the device 60. Such entities will likely include credit card companies and banks issuing debit cards such as ATM cards. The device issuer 64 is the entity that sells the devices 60, and in implementation will likely include a plurality of device issuers. The device issuer 64 will maintain information relating to the identity of the device 60. The information will preferably be maintained in a lookup table 70 for access during a financial transaction. As will be described in detail below, the present invention includes methods for securely transmitting the account code of the financial card 27 over the communications network 62 during the execution of a financial transaction. The interaction of the device 60, the device issuer 64, the acquirer 66, and the card issuer 68 will also be described therein. It should be understood that the same entity might perform more than one of the above-described functions. For example, a bank might be a device issuer 64, as well as a card issuer 68.

The device 60 of the present invention is shown in FIG. 3. The device generally comprises a housing 80, a card reader slot 82, an electronic circuit 84 (shown in FIGS. 4 and 5), and communications connectors J1 and J2. The housing 80 is preferably constructed with a lightweight, durable material, such as plastic. The housing 80 encloses the electronic circuit 84 for the device 60. Also, in the preferred embodiment, the device includes a means for entering data, such as keypad 90. Connector J1 is adapted to interface the device 60 to the telephone 65 and connector J2 is adapted to interface the device to the incoming telephone line 63 from the central office of the public switched telephone network.

Figure 4:
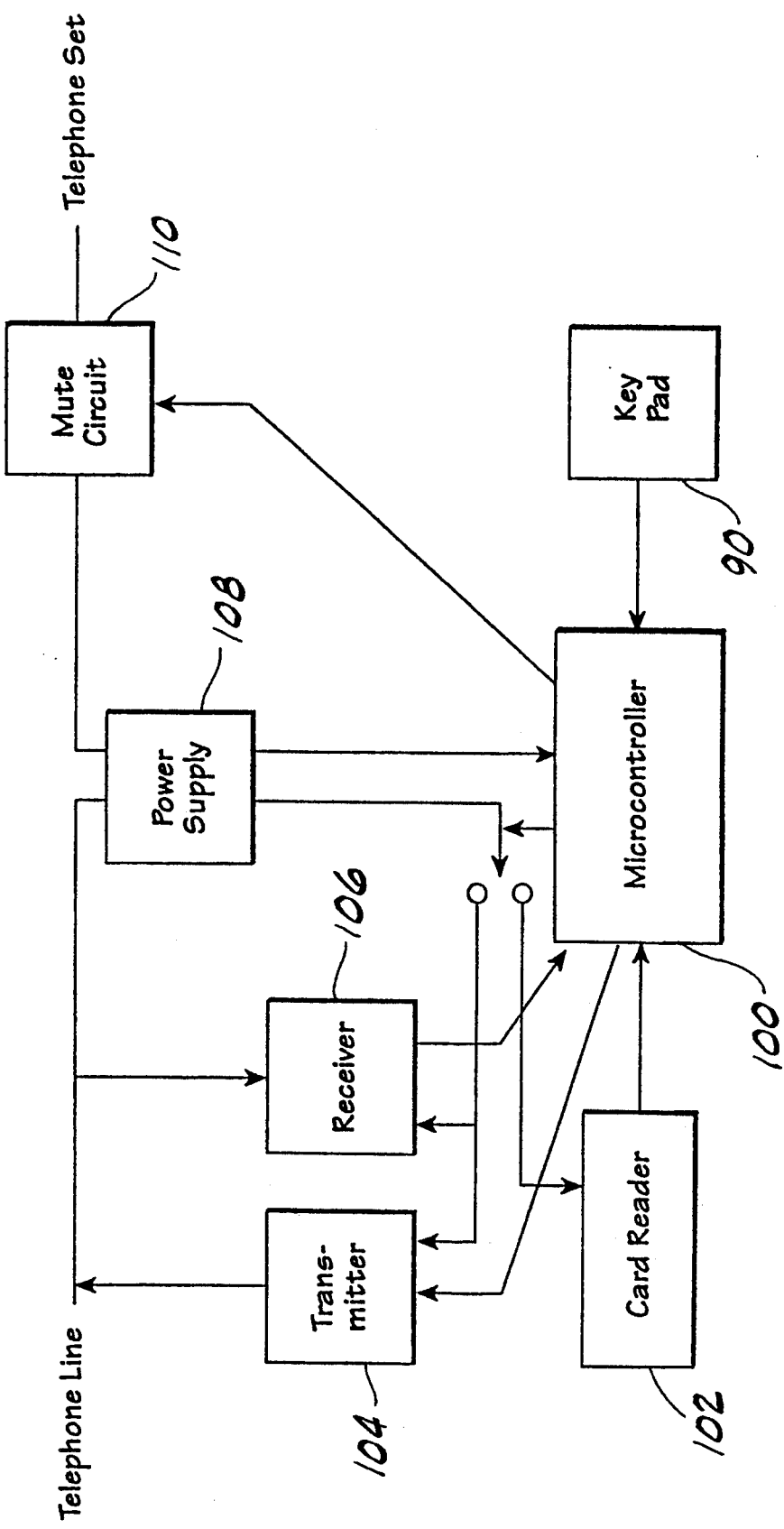
FIG. 4 is a block diagram of the electronic circuit for the device constructed according to a preferred embodiment of the present invention, and generally showing the connection of various components of the device to the existing telephone network.
Figure 5B:
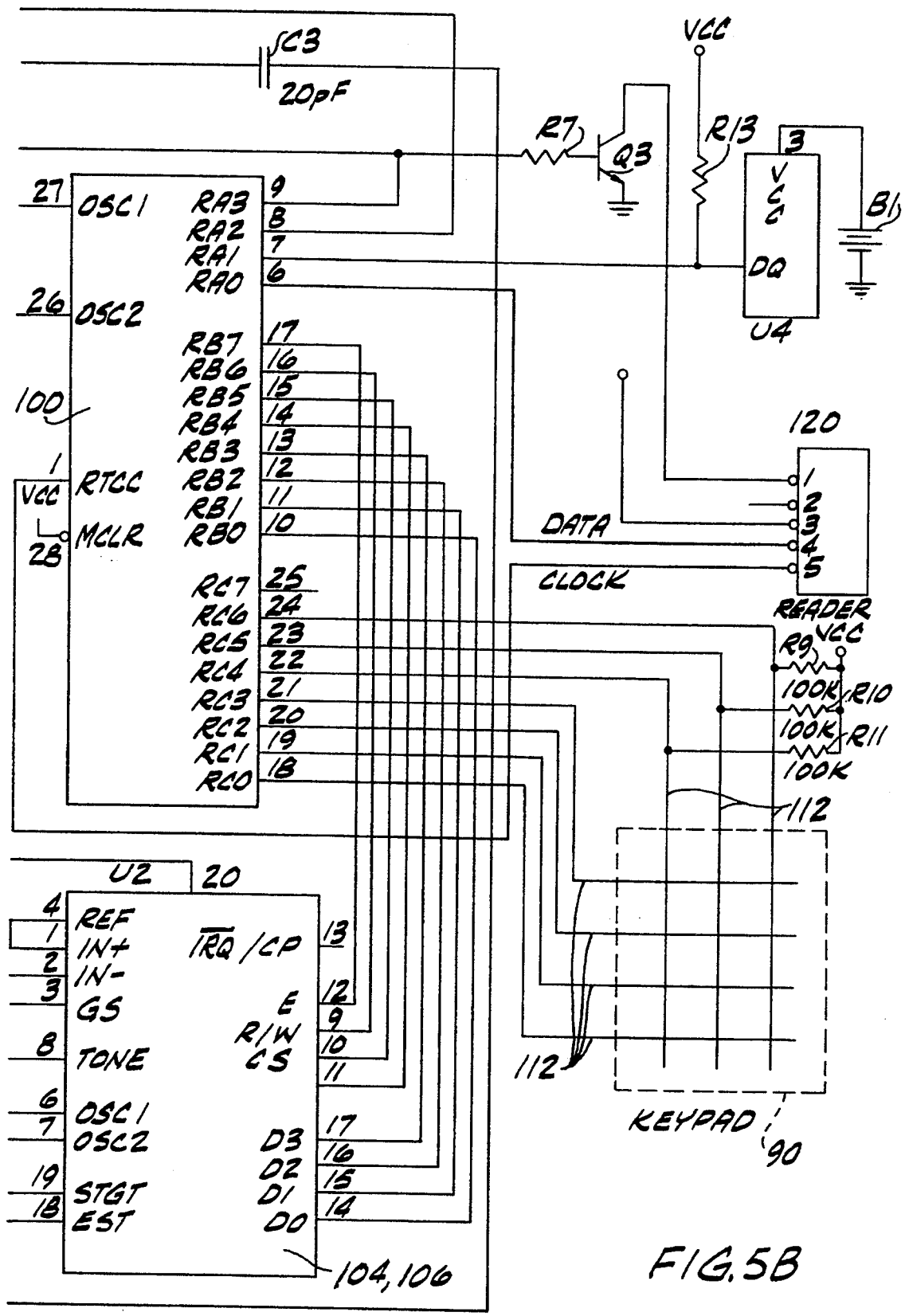
FIG. 5 is a schematic circuit diagram of the electronic circuit shown in block diagram form in FIG. 4.

The electronic circuit 84 is shown in block diagram form in FIG. 4 and in schematic form in FIG. 5. The electronic circuit 84 comprises a control circuit, such as a microcontroller 100, a card reader circuit 102 (which works in conjunction with the card reader slot 82), a transmitter 104, a receiver 106, and a power supply 108. In the preferred embodiment, the electronic circuit also comprises a mute circuit 110 and keypad connection lines 112.

Microcontroller 100 controls the sequence of operations of the rest of the electronic circuit 84 for the device 60. The microcontroller 100 includes a microprocessor central processing unit (CPU), erasable programmable read only memory (EPROM), random access memory (RAM), for working data, input-output (IO) circuits for connection to the rest of the device, and a crystal oscillator clock 120. The CPU implements 12 bit instruction word and 8 bit data word. The CPU also comprises an on-board amplifier for the clock 120, 12 bit wide program memory, 8 bit wide data memory, and input/output (I/O) drivers. The microprocessor 100 should also comprise an input for detecting falling edge transitions from the card reader circuit 102. The power and ground connections of microprocessor 100 are not shown in the schematic and should be connected to VCC and GND, respectively. The microcontroller 100, under the control of its program, scans the keypad connection lines 112, as is well-known in the art. Also, the microcontroller 100 captures and interprets pulses detected by the card reader circuit 102. Further, as will be described in detail below, the microcontroller 100 contains the program for implementing the encryption method for transmitting the secret PIN code and/or the detectable code 25 of the account code of the financial card 27. To this same end, the microcontroller controls transmission of data by the transmitter 104 and receipt of data from the receiver 106. Also, as will be described below, the microcontroller 100, in the preferred embodiment, controls the power supply in a unique way to reduce the power requirements of the device. One such possible microcontroller is a Microchip Technology PIC16C57XT microprocessor. This model is desirable because of its low cost and low power requirements (the importance of which will be described below), as well as the fact that its program memory can be secured against unauthorized readout. The Signetics 87C752 is a good alternative to the Microchip microprocessor.

In the preferred embodiment, the device 60 has the capability to add a second level of encryption with a remotely programmed working key. To accomplish this function, a separate battery powered RAM memory U4 is provided. One possible memory U4 is the Dallas Semiconductor DS2223. The RAM is interfaced to the microcontroller 100 through a single I/O pin 7.

The Microchip PIC16C57XT does not provide an internal pullup resistor and the I/O pin of the DS2223 is an open collector. Thus, resistor R13 is required to pull the pin up when both devices place their pins in a high impedance state.

B1 is a small lithium battery type BR1235 or CR1620, and is used to maintain the data in RAM U4 when the telephone set is on hook and the device is not powered. Further, a circuit or switch can be provided to disconnect the battery B1 from the RAM U4 if the device housing 80 is opened, thereby erasing the protectable information contained therein. Also, the switch could comprise a phototransistor, or the like, which would disconnect the battery B1 if light is incident upon the phototransistor, such as would occur if the housing 80 were opened.

The crystal oscillator clock 120 comprises a 3.579 MHz crystal. This crystal is preferable for its low cost, and also because the transmitter 104 and receiver 106 operate at that frequency, thereby eliminating the need for additional clock circuits for those devices. An inexpensive color-burst crystal may be used.

Capacitor C3 provides load capacitance for clock 120, and couples the clock to the transmitter 104 and the receiver 106. Capacitor C4 provides load capacitance for clock 120.

In the preferred embodiment, the transmitter 104 and the receiver 106 transmit and receive, respectively, dual tone multiple frequency (DTMF) signals. The transmitter 104 and receiver 106 are well known in the art, and can be consolidated on a single transceiver chip U2 (shown in FIG. 5), such as the Mitel Semiconductor MT8880 Chip. The Mitel chip includes a DTMF encoder/transmitter which generates all sixteen standard DTMF tones on demand from the microcontroller 100. DTMF tones, as described in greater detail below, are used to transmit data four bits at a time to remote locations having computers. The DTMF tones are encoded in 51 millisecond (ms) bursts separated by 51 ms of silence. The receiver portion of chip U2 recognizes DTMF tones from the central office and transmits the tones to the microcontroller 100 for processing. The Mitel chip requires extra clock pulses supplied under the control of the microcontroller 100.

Additional coupling components for the transceiver chip U2 are resistors R2, R3, R4, R5, capacitors C2, C5, C6, and amplifier transistor Q1. Resistors R2 and R3 set the input sensitivity of the DTMF receiver 106. The input stage of chip U2 is wired in single ended configuration with the divider presenting signal energy to the inverting input and the noninverting input tied to the reference output. Resistors R2 and R3 are preferably ⅛ watt resistors. Capacitor C5 couples the audio signal from the telephone line to the input of chip U2 and blocks either polarity DC signal. Capacitor C5 should be a 200 working voltage mylar or polystyrene capacitor. Resistor R5 and capacitor C6 form an RC network which controls the minimum permissible tone burst length and interdigit delay that the DTMF receiver 106 will recognize as valid and discrete digits. Capacitor C6 can be a 20 volt mylar capacitor and resistor R5 can be a ⅛ watt resistor. Capacitor C2 bypasses and absorbs excess 3.579 MHz energy from the switching output stage of chip U2 and prevents the noise signal from being radiated from the telephone line.

Transistor Q1 is a high voltage NPN transistor which amplifies the output signal from chip U2 and converts that varying voltage signal to a varying audio frequency current in the telephone line 63. Transistor Q1 is direct coupled to the output of chip U2 to provide DC bias so that transistor Q1 is always conducting in its linear region.

Resistor R4 performs three functions. Resistor R4 sets the DC operating point of transistor Q1 to a high enough current so that the DC insertion loss of transistor Q1 is minimized. Resistor R4 also loads the output of chip U2 as required because chip U2 (the Mitel chip) is a switched capacitor design. Further, resistor R4 sets the AC gain of transistor Q1 to a level that results in a 0 to 6 dbm audio output when measured across the 600 ohm impedance of the telephone line.

The card reader circuit 102 is an American Banking Association track 2 reader that outputs a negative going TTL level pulse on the clock line for every data bit and presents the inverted TTL data bit on the data line. The card reader circuit 102 used in the prototype is a Neuron Electronics model MCR575-1R. Compatible readers are also available from Magtek, American Magnetics, Nippodenso, and Panasonic. As the financial card 27 is passed through the card reader slot 82, the microcontroller 100 detects each clock pulse and reads the state of the data line. The microcontroller 100 monitors the bit stream for the start sentinel pattern and then accumulates 5 bit digits in the internal RAM memory. When the end sentinel is detected, and the longitudinal redundancy check buffered, the data is checked for horizontal or vertical parity errors.

The keypad 90 is likewise well-known in the art. The keypad has 12 keys 130 (shown in FIG. 3) which are similar to those found on a push-button telephone dial. The keys are arranged in a matrix of four rows and three columns. The keypad 90 allows the user to enter the PIN number associated with the financial card, and to also transmit nonsecure data during a financial transaction performed over the communications network 62. The microcontroller 100 scans the keys 130 of the keypad 90 by alternating setting one of the row lines connected to outputs RC0, RC1, RC2, and RC3 to a low level and testing for a low level on one of the column sense lines RC4, RC5, and RC6. Pullup resistors R9, R10, and R11 maintain the column lines at a high level when a key press does not connect them to a low row line.

In the preferred embodiment, the power supply 108 connects to the phone line and supplies power to the device 60 solely from the power received from the telephone line. Thus, the power supply eliminates the need to obtain power for the device from an external source, such as a wall outlet. Importantly, the power supply disclosed herein extracts sufficient power from the telephone line to operate the device without interfering with the operation of the telephone. Referring to FIG. 3, the power supply comprises a bridge rectifier D1, zener diode D2, filter/reservoir capacitor C1, power switching transistors Q2 and Q3, base resistors R6 and R7, and bias resistor R12. The power supply provides regulated 5 V power to the electronic circuit 84 over a line current range of 20 to 100 milliamperes. The rectifier D1 ensures that power of the proper polarity is supplied to the other electronic circuits of the device 60, irrespective of the polarity of the power received from the telephone line. The zener diode D2 is connected in series with the telephone line and limits the voltage supplied to the device 60 to 5 volts independent of telephone current variations resulting from varying mileage from the central office, differing central office equipment, different makes and models of telephone set, as well as AC audio speech and DTMF signals. The zener diode D2 should be capable of dissipating 500 milliwatts.

The two switching transistors Q2 and Q3 direct power either to the card reader circuit 102, or to the transmitter 104 and receiver 106, as controlled by the microcontroller 100. This methodology is desirable because only the card reader circuit 102, or the transmitter 104 and receiver 106 (chip U2) will operate at one time. Thus, this switching methodology reduces the power requirement of the device, which is important in this low power application. The remainder of the electronic circuits of the device 60 are chosen and designed so that power consumption does not exceed 20 mA, which is the minimum current guaranteed by telephony standards to be available from the telephone line. Transistor Q2 is a silicon PNP transistor which is forward biased by current flow through resistor R6 when output RA6 of the microcontroller 100 is in the low state. In this state, the transistor Q2 switches on the supply voltage to the transmitter 104 and receiver 106 for those phases of the protocol which require signaling to or from remote locations. Transistor Q3 is a silicon NPN transistor which switches the power supply voltage to the card reader circuit 102 in a manner similar to the switching operation performed by transistor Q2. Transistor Q3 is biased on when output RA3 of the microcontroller is in the high state. Thus, transistor Q3 conducts (switches on) when transistor Q2 does not conduct (switched off), and vice versa.

Capacitor C1 filters the DC power supply voltage, bypasses audio signals, and provides a reservoir of operating power when particularly large excursions of line current are received (such as from loud sounds, dial pulses, or supervisory loop current interruptions). Capacitor C1 is an aluminum electrolytic type with a working voltage rating of 10 volts. Capacitor C7 is a 0.1 microfarad capacitor which serves as a high frequency bypass of the power supply around the transmitter 104 and receiver 106. Capacitor C7 is a 20 working volt mylar type capacitor, but could also be a ceramic disc type capacitor.

Resistor R6 is a ⅛ watt carbon film type resistor. The resistance of R6 is preferably 22,000 ohms so that sufficient current is drawn from the base of transistor Q2, and when multiplied by the current gain of transistor Q2, sources sufficient supply current for proper operation of the transmitter 104 and receiver 106. A smaller value for resistor R6 would waste power by dissipating power in resistor R6. Resistor R7, like resistor R6, limits base current to transistor Q3 to a value sufficient to operate the card reader circuit 102, but not wastefully in excess of that value. Resistor R7 is likewise preferably about 22,000 ohms, but may need to be recalculated for different models of card reader. Resistor R12 provides sufficient bias current to maintain transistor Q1 (operation described below) in the conduction mode when DC current is not supplied to transmitter 104 and receiver 106 through transistor Q1 at power up or when the transmitter 104 and receiver 106 shut down (which occurs when the power supply directs power to the card reader circuit 102).

The mute circuit 110 limits the volume level of DTMF tones transmitted to the telephone 65 when the device 60 is outputting data by shunting the telephone connector J1 with a resistance on command by the microcontroller 100. The microcontroller 100 activates the mute circuit 110 prior to activating the transmitter 104 to transmit DTMF signals to the computer at the remote location. The microcontroller 100 deactivates the mute circuit 110 when the transmitter 104 is not transmitting data to the remote location so that the telephone user can hear voice prompts and other desired audio communications from the remote location, which could be from the computer at the remote location and/or a human operator.

The mute circuit is comprised of optocoupler U3, resistors R1 and R8. The optocoupler U3 can preferably be a Sharp PC729 design. FIG. 5 shows an oversimplified optocoupler. It is connected so that the light emitting diodes are in series and both output stages are in series. This connection provides bipolar operation of the output stage so that correct mute circuit operation is independent of telephone line polarity. When output RA2 of the microcontroller 100 is in a low state, current flows through the LED and the output transistors are energized connecting resistor R1 across the telephone 65.

When the output stage of optocoupler U3 is energized, about ½ of the line current of the telephone line 63 is diverted from the telephone 65 through resistor R1. Resistor R1 should be a ¼ watt resistor. Resistor R8 sets the current through the LED of the optocoupler U3. Optocoupler U3 has a transfer ratio of about 4000%, and thus the value of resistor R8 should be chosen to allow about 1 milliampere to flow through the LEDs of optocoupler U3 so that up to 40 milliamperes can be conducted through the output of optocoupler U3. Resistor R8 is preferably a ⅛ watt carbon film resistor having a value of about 2200 ohms.

Referring to FIG. 2, the device 60 also comprises a device issuer identification (ID) 140, an identity offset 142, and a master key 146. The device issuer 64 maintains the lookup table 70 comprising identity offsets 142 and corresponding master keys 146 for each device 60 manufactured and sold or otherwise distributed by the device issuer. Lookup table 70 is maintained on a computer 144 at the device issuer location (hereinafter "device issuer computer"). The device issuer computer 144 also comprises an encryption device 145 for encrypting data under the master key 146, as will be described below, using the DES algorithm 36.

The acquirer 66 comprises a computer 152 (hereinafter "acquirer computer"). The acquirer computer 152 comprises software for generating a variable working key 154 for encrypting data with the DES algorithm. The acquirer computer 152 also comprises an encryption device 156 and software for implementing the DES algorithm 36 to encrypt data under the working key 154.

The financial card issuer 68 comprises a computer 160 (hereinafter "card issuer computer"). The card issuer computer 160 comprises an encryption device 162 for encrypting data with the DES algorithm under the predetermined encryption key 164, as described above in the prior art ATM network.

In practice, the user of device 60 will place a phone call to a remote location with which the user desires to perform a financial transaction. For example, the user might desire to pay a utility bill, such as the gas bill, from funds maintained in the user's bank account using an ATM debit card from the user's home. To perform this transaction, the user would call the utility company or an acquirer service bureau, such as a bank, serving the utility as a surrogate acquirer with the telephone 65 adjacent the device 60. With reference to FIG. 2, the utility would be referred to as the acquirer 66.

The utility would preferably have a computer automated answering service which would provide a DTMF-activated menu having a selection for paying bills using the financial card 27. Upon activating this menu selection, the user would eventually be prompted to enter the financial card 27 through the card reader slot 82. The user would then be prompted to enter the secret PIN code, if applicable (i.e., for ATM cards but typically not required for credit cards). As explained above, current banking laws require the secret PIN code to be transmitted in encoded form. Because the device 60 and acquirer 66 will typically not have a preestablished encryption key (due to the vast number of possible acquirers and users of the devices), the device and acquirer cannot transmit data in encoded form without first developing a common encryption key.

To create a common encryption key between the acquirer 66 and the device 60, the following method is preferably implemented. Referring to FIG. 2, in the first step, designated S1, the device 60 transmits a packet of information including the device issuer identification (ID) 140 (for simplicity of illustration designated as the letter X), and the identity offset 142 (designated as the number 3). In step 2, designated as S2, the acquirer computer 152 generates a random working key 154 which varies with each device 60 that contacts the acquirer 66. The working key is show as the number 42 for purposes of illustration. In step 3, designated as S3, the acquirer computer 152 transmits the identity offset 142 and the working key 154 (3,42) in encrypted form (shown as 7,92 for illustration) under an encryption key common to the device issuer 64 and the acquirer 66 to the device issuer 64 designated by the device issuer ID 140 (i.e., by the code letter X). The communication between the device issuer 64 and the acquirer 66 is similar to the communication between the ATM machines 22a–n and the banks 24a–n in the prior art ATM network, described above. Different device issuers would have different device issuer IDs, and the acquirer computer 152 would maintain a lookup table for the various device issuers 64 and their corresponding network addressing information.

In step 4, designated as S4, the device issuer computer 144 unencrypts the identity offset 142 and the working key 154 with the common encryption key, and encrypts the working key 154 (i.e., 42) under the master key 146 (456) corresponding to the transmitted identity offset 142 (i.e., 3) to generate a cryptogram (designated as the number 832 for illustration). In step 5, designated as S5, the acquirer computer 152 transmits the working key cryptogram (i.e., 832) to the device 60. In step 6, designated as S6, the microcontroller 100 unencrypts the encrypted working key (i.e., 832) under the master key (456) to obtain the working key 154 (42) in the clear. In step 7, designated as S7, the microcontroller 100 of device 60 causes the transmitter 104 to transmit the secret PIN code portion encrypted (shown as 17 for illustration purposes) under the working key 154 (42) to the acquirer computer 152. The acquirer computer 152 translates the PIN block cryptogram from the device working key to a communication key agreed on with the card issuer, and can transmit this cryptogram with the card account number and other transaction details to the card issuer 68 in encrypted form under an encryption key common to the card issuer 68 and the acquirer 66, as was performed in the prior art (explained above). The card issuer 68 and the acquirer 64 can perform communications necessary to accomplish the financial transaction requested by the user of the device 60 after verifying the validity and accuracy of the account code of the financial card.

Further, in the preferred embodiment, the acquirer 66 could maintain a lookup table of an established working key 154 associated with a particular device so that the above described process need not be repeated every time the device 60 contacts the same acquirer. Such a lookup table would reduce transaction time for future financial transactions between the device 60 and the acquirer 66, and would also decrease network traffic. Further, the acquirer computer 152 could automatically reestablish a new working key after a predetermined time elapsed and/or after the old working key is used in a predetermined number of transactions, thereby increasing the safety of the financial transmission system.

Further, in the preferred embodiment, the acquirer 66 could request more than one working key 154 be encrypted in each call to the device issuer 64. Such additional working key cryptograms would be used in future transactions with the device 60. This method reduces the number of transactions required between the acquirer 66 and the device issuer 64 while providing sufficient frequency of changing the working key used to encrypt the secret PIN.

Further, the acquirer 66 and device 60 could utilize a completely unique key for each transaction without the necessity of requesting a completely new working key encryption operation from the device issuer 64 by varying the working key 154 for each transaction. Such variation could be performed by the acquirer 66 generating a key variant generator of four or eight bits and transmitting that number to the device with each request for encrypted data in step 7 (S7). The device and the acquirer would both apply the key variant generator to the working key by an exclusive-or operation. The key variant generator can be incremented sequentially or randomly but should not be repeated for a given base working key. This implies that each base working key can be used a maximum of 16 (for a 4 bit key variant generator) or 256 (for an eight bit key variant generator) times before the base working key must be changed. The key variant generator may be transmitted to the device 60 in the clear because it is useless without knowledge of the working key. Using a unique key for each transaction enhances the security of the protocol by preventing a PIN cryptogram used in prior transaction from being stolen and used in a later, fraudulent transaction.

The above-described method is the preferred method for creating a common secret encryption key between the device 60 and the acquirer 66. However, the method could be altered to accomplish the same result. For instance, the device issuer 64 could generate the working key 154 and transmit the working key encrypted under the master key 146 as well as the working key 154 encrypted under the encryption key common between the acquirer 66 and the device issuer 64 (similar to the prior art ATM network). The acquirer 66 could determine the clear text of the working key 154, and could transmit the working key encrypted under the master key 146 to the device 60 so that the device could also determine the working key, thereby making the working key common to the acquirer 66 and the device 60. In another embodiment, the device could generate the working key 154 and transmit the working key to the acquirer 66 encrypted under the master key 146. The acquirer could transmit the encrypted working key to the device issuer 64. The device issuer could thereafter unencrypt the encrypted working key using the master key 146, known by the device issuer 64. The device issuer 64 could thereafter transmit the working key in encrypted form under an encryption key common to the device issuer 64 and the acquirer 66 (similar to the prior art), thereby making the working key common to the device 60 and the acquirer 66.

The important aspect about the method is programming the device with the secret master key and the nonsecret identity offset, as well as the device issuer 64 maintaining the lookup table 70. The established encryption key between the device issuer 64 and the acquirer 66 (as in the prior art) coupled with the identity offset/master key pair common between the device 60 and the device issuer 64 allow the device 60, the device issuer 64, and the acquirer 66 to develop a common working key, thereby allowing the device 60 and the acquirer 66 to develop a common working key for transmitting data (i.e., the secret PIN number) in encrypted form. Also, if there is more than one device issuer, the device issuer identity is necessary so that the acquirer can determine which device issuer with which to communicate.

Turning now to a more detailed explanation of the encryption process, the device 60 encrypts the PIN number for transmission to the acquirer 66 using the DES algorithm described above. The microcontroller 100 of device 60 uses 64 bit keys to encrypt the PIN number. The 64 bit binary numbers are transmitted as 16 DTMF digits. DTMF 0-9, *, #, and A-D are coded as binary patterns 0000 through 1111, respectively. The 64 bit key or cryptogram is transmitted most significant nybble (4 bits) first. The PIN is encoded as a packet of 4 or more (if the PIN number is more than 4 characters) 4 bit BCD digits.

Unauthorized decryption of DES encoded messages depends on iteratively deciphering the cryptogram with all possible keys and recognizing the clear text when it is produced. Not only is such an iteration prohibitively large, but, since the clear text in this case is a decimal number, it is difficult to recognize which of the $10^4$ or more (if PIN is more than 4 characters) is the correct PIN number.

Because current PIN numbers are comprised solely of numbers, this invention encompasses the following method for further increasing the difficulty in deciphering a transmitted PIN number. The microcontroller 100 of device 60 will insert random bits in the PIN block to make all 4 bit patterns potential valid codes. If a digit of the PIN number is in the range of 2 (0010) through 7 (0111), the $2^3$ bit of that digit is exclusive-ored with 8 (1000) with a 50% probability. This increases the number of the $2^{56}$ messages produced by iterative probing that could be valid PINs from $10^N$ to $16^N$, for an N digit PIN number.

A supply of random bits is generated in the device by sampling a fast 1 bit counter at every user key stroke of the device 60. It is important for the counter to be synchronous to the keypad 90 so that the scanning process of the keys 130 is asynchronous to therefore produce true random bits, and to ensure that there is not a fixed harmonic relationship to the recognition of the keystroke.

The acquirer computer 152 can readily decode the random bit. If a particular 4 bit code is in the range of 1010 to 1111, the acquirer computer 152 will subtract the 4 bit code 1000 to obtain the clear digit. The acquirer computer 152 will implement a lookup table to accomplish this result as a part of the PIN cryptogram translation from the device working key to the card issuer communication key.

Further, if the PIN number is less than 64 bits (16 digits), the packet of information transmitted from the device 60 to the acquirer 66 may be padded with random bits. The acquirer computer 152 will strip off the random padding bits to obtain the PIN number. Because all digits are used in the transmission, and the transmission could involve more than one 16 digit packet, the end of the message is identified by a time-out in the acquirer computer 152. If more than a second elapses between packets, the message is complete. The acquirer computer 152 translates the PIN block cryptogram, and forwards the new cryptogram to the card issuer.

The identity offset 142 of the device 60 need not be transmitted with every transaction. The acquirer 66 receiving the transaction will likely receive many transactions from the same device and should maintain a database of identity keys by originating telephone number which can be obtained from the telephone carrier through ANI or CI protocols which are well-known in the industry. In this way, repeat calls from the same device may be immediately identified and the system security and performance is therefore enhanced by reducing the amount of information that must be transmitted. If a transaction fails because the master key is wrong, a retry can include enquiring the identity offset 142, and the ANI/identity offset database can be updated. For maximum security, a counter could be maintained on ANIs and on identity offsets to detect various types of intrusion attempts such as the same device calling in on many ANIs.

In order for the above-described protocol to operate securely, the device master key 146 must remain a secret. The master key 146, identity offset 142, and the device issuer ID 140 are programmed into the device 60 by the device issuer 64. The device issuer ID is a unique code which is assigned to a particular device issuer 64 preferably by some central arbiter to uniquely identify the particular device issuer. The identity offset 142 should be a pseudo-random number generated by some appropriate method such as a maximal length linear congruential sequence but must not be duplicated for devices sold by a particular device issuer 64. The master key 146 is preferably a 64 bit random number. As explained above, each identity offset 142 of a device 60 is paired with a random master key 146. The identity offset/master key pairs are kept in two places only: a secure database under control of the device issuer, and in the distributed existential database of the device 60. On demand, as described in the protocol above, the device 60 reports its identity offset 142 to the acquirer 66. The device 60 never reveals its maser key 146 and, as described above, the device issuer 64 does not reveal the master key 146 either. If an intruder by some means obtains the master key of a given device, the intruder is no closer to knowing the master key of any other device because the relationship between the pseudo-random identity offset and the random master key is incomputable.

The pseudo-random nature of the identity offset makes searching the master key database particularly amenable to hashing. This reduces the size of data storage required and enhances reliability and performance of the secure master key repository. A small minicomputer provides more than sufficient computing ability for a particular device issuer 64, and could be made redundant to enhance availability and throughput as desired or needed.

Extracting the master key of a given device will require physical disassembly and advanced electronic techniques. It is no doubt possible to determine the master key of any given device given sufficient time, computer power, and other resources. That information alone, however, is relatively valueless as it gives no clue as to the master key in other devices. The security of this invention is not dependent on the algorithms and protocols being kept secret.

It can therefore be seen that the financial transmission system disclosed herein allows financial transactions to be performed by the device 60 with remote locations over the same communications link used to perform voice communications via the telephone 25 with the remote location. Further, the methods disclosed herein allow the detectable code 25 and/or the secret PIN number to be securely transmitted across the communications circuit. Further, even if the account code of a credit card is not transmitted in encrypted form, the device 60 requires the credit card to be present during a telephone financial transaction, thereby substantially reducing the risk of credit card fraud.

With reference to the circuit components of FIG. 5 generally, all resistors are preferably carbon film-type resistors with a tolerance of 10% or less. The power requirements and working voltage requirements stated above represent minimum values which include an engineering safety margin. Components of finer tolerances could be used if desired or if particular applications warrant narrower tolerance. The value of the components stated above only represent the preferred embodiment, and could also be varied if desired or if a particular application requires modification. Further, the DTMF functions performed by the transmitter 104 and the receiver 106 could be integrated in hardware or could be performed in microcontroller software if suitably fast analog to digital and digital to analog converters are utilized. Also, in large scale production, the majority of circuit components could be combined on a single integrated circuit chip. In particular, it is desirable to integrate the memory U4 into the microcontroller 100 to prevent probing of the connection therebetween in an attempt to ascertain the contents of the memory.

It should also be understood that one entity might perform more than one role in a financial transaction. For instance, a bank might be a device issuer as well as the card issuer. Such modifications are contemplated by the present invention and do not depart from the teachings disclosed hereinabove.

From the foregoing, it will be seen that this invention is one well-adapted to attain all of the ends and objects hereinabove set forth together with other advantages which are obvious and which are inherent to the structure. It will be understood that certain features and subcombinations are of utility and may be employed without reference to other features and subcombinations. This is contemplated by and is within the scope of the claims. Since many possible embodiments may be made of the invention without departing from the scope thereof, it is to be understood that all matters herein set forth as shown in the accompanying drawings are to be interpreted as illustrative and not in a limiting sense.

What is claimed is:

1. A device for performing financial transactions in conjunction with a telephone over a communications link in a communications network with a computer at a remote location, using a financial card having an account code, the device comprising:
   control means for controlling operation of the device;
   reader means for determining the account code of the financial card;
   means for transmitting the account code over the communications link of the communications network to the computer at the remote location;
   receiver means for receiving information sent by the computer over the communications link;
   a communications connector adapted to connect to the communications network and the telephone so that voice communications can be performed by the telephone over the communications link and so that the device can transmit and receive data to and from the computer at the remote location, respectively, over the communications link used by the telephone to perform voice communications; and
   a power supply connecting to the communications network to provide power to the device solely from the power of communications network.

2. The device of claim 1 wherein the receiving means and the transmitting means comprise a DTMF receiver and transmitter, respectively, for transmitting and receiving DTMF signals.

3. The device of claim 2 wherein the DTMF receiver and the DTMF transmitter comprise means for receiving and transmitting sixteen different DTMF signals.

4. The device of claim 2 wherein the communications connector comprises a connector adapted to create a series connection of the device between the communications network and the telephone.

5. The device of claim 4 wherein the telephone is connected to the communications network by a telephone line, and wherein the communications connector comprises two connectors, one connector being adapted for connecting to the telephone line and the other connector being adapted to connect to the telephone.

6. The device of claim 1 wherein the power supply further comprises rectifying means to ensure that proper power polarity is supplied to the device irrespective of the power polarity of the communications network.

7. The device of claim 6 wherein the power supply comprises switching means to supply power alternately to the reader means, or the transmitting and receiving means to reduce the power drawn by the device.

8. The device of claim 7 wherein the switching means comprises two switches, one switch being connected to the reader means and the other switch being connected to the transmitter means and the receiver means, and wherein both switches are connected to the control means, the control means causing activation of only one switch at one time to supply power to the reader means, or the transmitter means and the receiver means.

9. The device of claim 8 wherein the two switches comprise transistor switches.

10. The device of claim 6 wherein the rectifying means comprises a full wave rectifier.

11. The device of claim 6 wherein the device further comprises an entering means for entering a secret code portion of the account code, the entering means being connected to the control means.

12. The device of claim 11 wherein the entering means comprises a keypad having keys for entering the secret code portion.

13. The device of claim 11 wherein the device further comprises a muting means connected to the control means, the control means selectively activating the muting means for muting the DTMF signals generated by the DTMF transmitter to reduce the sound level of the DTMF signals in an earphone of the telephone.

14. The device of claim 13 wherein the muting means comprises an optocoupler for connecting the muting means to the control means so that the muting means operates irrespective of the polarity of the communications network.

15. The device of claim 13 wherein the device further comprises an encryption means for transmitting the secret code portion in encrypted form.

16. The device of claim 15 wherein the encryption means comprises an encrypting algorithm.

17. The device of claim 16 wherein the algorithm comprises a DES algorithm.

18. A device for performing financial transactions in conjunction with a telephone over a communications link in a communications network with a computer at a remote location, using a financial card having an account code, the device comprising:
   control means for controlling operation of the device;
   reader means for determining the account code of the financial card;
   DTMF transmitter means, coupled to the control means for receiving the account code of the financial card from the control means and for transmitting the account code over the communications link of the communications network as DTMF signals;
   receiver means for receiving information sent by the remote computer via the communications link and for providing the information to the control means;
   a communications connector adapted to connect to the communications network and the telephone so that voice communications can be performed by the telephone over the communications link and so that the device can transmit and receive data to and from the computer at the remote location, respectively, over the communications link used by the telephone to perform voice communications; and a muting means connected to the control means, the control means selectively activating the muting means for muting the DTMF signals generated by the DTMF transmitter to reduce the sound level of the DTMF signals in an earphone of the telephone.

19. The device of claim 18 wherein the communications connector comprises a connector adapted to create a series connection of the device between the communications network and the telephone.

20. The device of claim 19 wherein the telephone is connected to the communications network by a telephone line, and wherein the communications connector comprises two connectors, one connector being adapted for connecting to the telephone line and the other connector being adapted to connect to the telephone.

21. The device of claim 20 wherein the DTMF transmitter means comprise means for transmitting sixteen different DTMF signals.

22. The device of claim 21 wherein the receiver means comprises a DTMF receiver for receiving DTMF signals transmitted by the computer at the remote location.

23. The device of claim 22 wherein the muting means comprises an optocoupler for connecting the muting means to the control means so that the muting means operates irrespective of the polarity of the communications network.

24. The device of claim 19 wherein the device further comprises a power supply.

25. The device of claim 24 wherein the power supply connects to the communications network to provide power to the device solely from the power of communications network.

26. The device of claim 25 wherein the power supply comprises switching means to supply power alternately to the reader means, or the transmitting and receiving means to reduce the power drawn by the device.

27. The device of claim 26 wherein the switching means comprises two switches, one switch being connected to the reader means and the other switch being connected to the transmitter means and the receiver means, and wherein both switches are connected to the control means, the control means causing activation of only one switch at one time to supply power to the reader means, or the transmitter means and the receiver means.

28. The device of claim 18 wherein the device further comprises an encryption means for transmitting at least part of the account code of the financial card in encrypted form.

29. The device of claim 28 wherein the encryption means comprises an encrypting algorithm.

30. The device of claim 29 wherein the algorithm comprises a DES algorithm.

31. A device for performing financial transactions in conjunction with a telephone over a communications link in a communications network with a computer at a remote location, using a financial card having an account code, the device comprising:

control means for controlling operation of the device;
reader means for determining the account code of the financial card;
means for transmitting the account code over the communications link of the communications network;
receiver means for receiving information sent by the remote computer via the communications link and for providing the information to the control means;
a communications connector adapted to connect to the communications network and the telephone so that voice communications can be performed by the telephone over the communications link and so that the device can transmit and receive data to and from the computer at the remote location, respectively, over the communications link used by the telephone to perform voice communications; and
a power supply connected to the telephone line for supplying power to the device solely by the power received from the telephone line, the power supply further being connected to the reader means, the transmitting means, the receiver means, and the control means to supply power thereto.

32. The device of claim 31 wherein the power supply comprises switching means to supply power alternately to the reader means, or the transmitting and receiving means to reduce the power drawn by the device.

33. The device of claim 32 wherein the switching means comprises two switches, one switch being connected to the reader means and the other switch being connected to the transmitter means and the receiver means, and wherein both switches are connected to the control means, the control means causing activation of only one switch at one time to supply power to the reader means, or the transmitter means and the receiver means.

34. The device of claim 33 wherein the power supply further comprises rectifying means to ensure that proper power polarity is supplied to the device irrespective of the power polarity of the communications network.

35. A device for performing financial transactions in conjunction with a telephone over a communications link in a communications network with a computer at a remote location, using a financial card having an account code comprised of a detectable portion and a nondetectable secret portion, the device comprising:

control means for controlling operation of the device;
reader means for determining the detectable code portion of the financial card;
an entering means for manually entering the secret code portion;
security means for encoding at least the secret code portion of the account code to prevent interception and deciphering of the secret code portion;
means for transmitting the detectable code portion and the encoded secret code portion over the communications link of the communications network;
receiver means for receiving information sent by the computer via the communications link and for providing the information to the control means;
a communications connector adapted to connect to the communications network and the telephone so that voice communications can be performed by the telephone over the communications link and so that the device can transmit and receive data to and from the computer at the remote location, respectively, over the communications link used by the telephone to perform voice communications; and a power supply connecting to the communications network to provide power to the device solely from the power of communications network.

36. The device of claim 35 wherein the power supply comprises switching means to supply power alternately to the reader means, or the transmitting and receiving means to reduce the power drawn by the device.

37. The device of claim 36 wherein the switching means comprises two switches, one switch being connected to the reader means and the other switch being connected to the transmitter means and the receiver means, and wherein both switches are connected to the control means, the control means causing activation of only one switch at one time to supply power to the reader means, or the transmitter means and the receiver means.

38. The device of claim 35 wherein the receiving means and the transmitting means comprise a DTMF receiver and transmitter, respectively, for transmitting and receiving DTMF signals.

39. The device of claim 38 wherein the device further comprises a muting means connected to the control means, the control means selectively activating the muting means for muting the DTMF signals generated by the DTMF transmitter to reduce the sound level of the DTMF signals in an earphone of the telephone.

40. In a financial network comprising a device at a user location for performing financial transactions in conjunction with a telephone over a communications network with a computer at an acquirer location (acquirer computer) and a computer at a device issuer location (device issuer computer), the device being adapted to transmit a secret account code, associated with a financial account of a financial card, over the communications network, a method for securely transmitting the secret account code over the communications network to allow a financial transaction to be conducted with the acquirer computer, the method comprising:

programming a secret master key into the device;

programming a nonsecret identity offset into the device;

maintaining a lookup table associating the master key to the nonsecret identity offset at the device issuer location;

generating a working key for encrypting data between the acquirer computer and the device; and using the identity offset, the master key and the lookup table to make the working key common between the acquirer and the device.

41. The method of claim 40 further comprising the step of programming a device issuer identifier (ID) into the device and using the device issuer ID to locate the device issuer corresponding to the device issuer ID.

42. The method of claim 41 wherein the step of using the identity offset, the master key and the lookup table to make the working key common between the acquirer and the device comprises:

the device transmitting the device issuer ID for designating the issuer of the device, and the identity offset associated with the master key common to the device and device issuer computer to the acquirer computer in unencrypted form;

the acquirer computer transmitting the working key and the identity offset to the device issuer computer designated by the device issuer ID in encrypted form under a predetermined encryption key common to the acquirer computer and the device issuer computer;

the device issuer computer unencrypting the encrypted identity offset and working key under the common encryption key;

the device issuer computer determining the master key associated with the identify offset;

the device issuer computer transmitting the working key in encrypted form under the master key to the acquirer computer;

the acquirer computer transmitting the working key encrypted under the master key in unencrypted form to the device;

the device unencrypting the working key encrypted under the master key by the device issuer computer with the master key which is common between the device and the device issuer computer, whereby the working key is common to the device and the acquirer computer; and the device, after receiving the secret account code of the financial card, transmitting the secret account code of the financial card in encrypted form under the working key to the acquirer computer.

43. The method of claim 41 wherein the method further comprises maintaining a lookup table associating the working key with the device so that the working key can be used in future communications between the acquirer and the device to encrypt data.

44. The method of claim 43 wherein the step of programming the master key into the device comprises the step of programming the master key on a memory in the device.

45. The method of claim 44 further comprising the step of erasing the memory if the device is opened.

46. The method of claim 45 wherein the step of maintaining a lookup table comprises the step of storing the lookup table on the memory of the device.

47. The method of claim 46 wherein the step of erasing the memory comprises detecting light inside of the device and erasing the memory upon detecting light.

48. In a financial network comprising a device at a user location for performing financial transactions over a communications network with a computer at an acquirer location (acquirer computer) and a computer at a device issuer location (device issuer computer), the device being adapted to transmit a secret account code, associated with a financial account of a financial card, over the communications network, a method for securely transmitting the secret account code over the communications network to allow a financial transaction to be conducted with the acquirer computer, the method comprising:

the device transmitting a device issuer identifier (ID) associated with the device for designating the issuer of the device, and an identity offset associated with a master key common to the device and device issuer computer to the acquirer computer in unencrypted form;

the acquirer computer, in response to receiving the identity offset and the device issuer ID, generating a random working key;

the acquirer computer transmitting the working key and the identity offset to the device issuer computer designated by the device issuer ID in encrypted form under a predetermined encryption key common to the acquirer computer and the device issuer computer;

the device issuer computer unencrypting the encrypted identity offset and working key under the common encryption key;

the device issuer computer determining the master key associated with the identify offset;

the device issuer computer transmitting the working key in encrypted form under the master key to the acquirer computer;

the acquirer computer transmitting the working key encrypted under the master key in unencrypted form to the device;

the device unencrypting the working key encrypted under the master key by the device issuer computer with the master key which is common between the device and the device issuer computer, whereby the working key is common to the device and the acquirer computer; and the device, after receiving the secret account code of the financial card, transmitting the secret account code of the financial card in encrypted form under the working key to the acquirer computer.

49. The method of claim 48 wherein the method further comprises the acquirer computer maintaining a lookup table associating the working key with the device so that the working key can be used in future communications between the acquirer and the device to encrypt data.

* * * * *